United States Patent
Li et al.

(10) Patent No.: US 10,278,195 B2
(45) Date of Patent: Apr. 30, 2019

(54) SERVING NODE ESTABLISHMENT METHOD AND DEVICE

(71) Applicant: Huawei Technologies Co., Ltd., Shenzhen (CN)

(72) Inventors: Mingchao Li, Beijing (CN); Xin Xiong, Beijing (CN); Yi Shi, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 102 days.

(21) Appl. No.: 15/705,510

(22) Filed: Sep. 15, 2017

(65) Prior Publication Data

US 2018/0007698 A1   Jan. 4, 2018

Related U.S. Application Data

(63) Continuation of application No. PCT/CN2015/074274, filed on Mar. 16, 2015.

(51) Int. Cl.
| | |
|---|---|
| *H04L 12/801* | (2013.01) |
| *H04L 5/14* | (2006.01) |
| *H04W 72/08* | (2009.01) |
| *H04W 72/04* | (2009.01) |

(52) U.S. Cl.
CPC ....... *H04W 72/085* (2013.01); *H04W 72/042* (2013.01)

(58) Field of Classification Search
CPC .......................... H04W 72/085; H04W 72/042
See application file for complete search history.

(56) References Cited

U.S. PATENT DOCUMENTS

| | | | |
|---|---|---|---|
| 2008/0192925 A1* | 8/2008 | Sachs | H04L 12/5692 380/29 |
| 2008/0205345 A1* | 8/2008 | Sachs | H04W 36/0011 370/332 |
| 2011/0319030 A1* | 12/2011 | Kondo | H04W 52/0206 455/67.11 |
| 2013/0210445 A1 | 8/2013 | Nakamura et al. | |
| 2014/0094183 A1 | 4/2014 | Gao et al. | |

(Continued)

FOREIGN PATENT DOCUMENTS

| | | |
|---|---|---|
| CN | 102845091 A | 12/2012 |
| CN | 103476091 A | 12/2013 |

(Continued)

*Primary Examiner* — Faruk Hamza
*Assistant Examiner* — Abusayeed M Haque
(74) *Attorney, Agent, or Firm* — Slater Matsil, LLP

(57) ABSTRACT

A method for serving node establishment includes sending, by a network device, information about a micro network time-frequency resource pool to a terminal; and sending measurement configuration information to the terminal. The measurement configuration information instructs the terminal to serve, when the terminal determines that the terminal meets a preset condition of a first measurement event, as a first serving node to send exclusive information of the first serving node on a first time-frequency resource in the micro network time-frequency resource pool according to the information about the micro network time-frequency resource pool, and the first measurement event is any one of the at least one measurement event.

20 Claims, 5 Drawing Sheets

A network device sends information about a micro network time-frequency resource pool to a terminal, where the information about the micro network time-frequency resource pool includes information about a time-frequency resource that is in a micro network and that is used to transmit exclusive information of a service node — S101

The network device sends measurement configuration information to the terminal, where the measurement configuration information includes a preset condition of at least one measurement event for triggering service node establishment, and the measurement configuration information is used to instruct the terminal to serve, when the terminal determines that the terminal meets a preset condition of a first measurement event, as a first service node to send exclusive information of the first service node on a first time-frequency resource in the micro network time-frequency resource pool according to the information about the micro network time-frequency resource pool — S102

(56) References Cited

U.S. PATENT DOCUMENTS

2014/0376458 A1 12/2014 Ryu et al.
2015/0043448 A1  2/2015 Chatterjee et al.
2015/0358950 A1 12/2015 Zhang et al.

FOREIGN PATENT DOCUMENTS

CN    104080176 A  10/2014
WO   2014127525 A1   8/2014

* cited by examiner

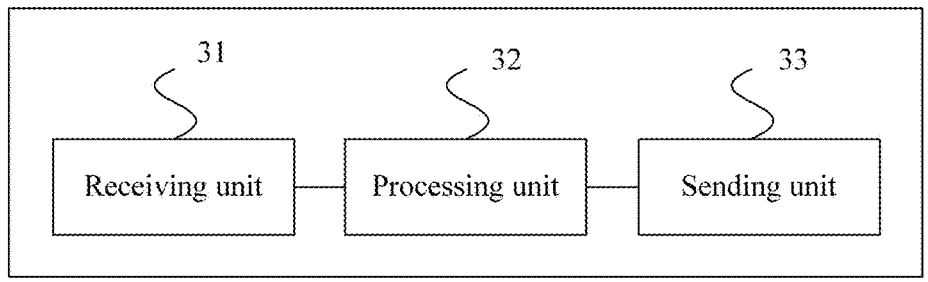

FIG. 4

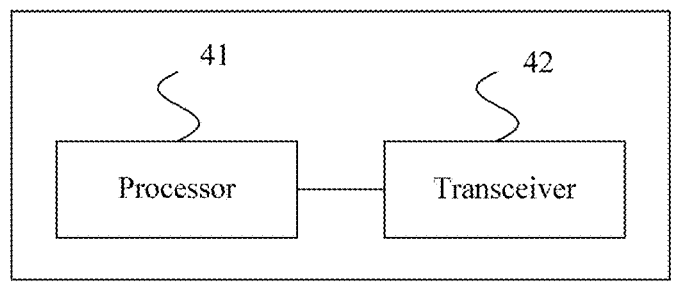

FIG. 5

A network device sends information about a micro network time-frequency resource pool to a terminal, where the information about the micro network time-frequency resource pool includes information about a time-frequency resource that is in a micro network and that is used to transmit exclusive information of a service node — S101

The network device sends measurement configuration information to the terminal, where the measurement configuration information includes a preset condition of at least one measurement event for triggering service node establishment, and the measurement configuration information is used to instruct the terminal to serve, when the terminal determines that the terminal meets a preset condition of a first measurement event, as a first service node to send exclusive information of the first service node on a first time-frequency resource in the micro network time-frequency resource pool according to the information about the micro network time-frequency resource pool — S102

FIG. 6

333
SERVING NODE ESTABLISHMENT METHOD AND DEVICE

CROSS-REFERENCE TO RELATED APPLICATIONS

This application is a continuation of International Application No. PCT/CN2015/074274, filed on Mar. 16, 2015, the disclosure of which is hereby incorporated by reference in its entirety.

TECHNICAL FIELD

Embodiments of the present invention relate to the field of communications technologies, and in particular, to a serving node establishment method and a device.

BACKGROUND

Currently, by means of vehicle to infrastructure (V2I) communication or vehicle to vehicle (V2V) communication, a vehicle can obtain road condition information or receive an information service in a timely manner. A network used for V2V/V2I communication may be referred to as the Internet of Vehicles. V2V/V2I information may be transmitted by using a Long Term Evolution (LTE) network, and the Internet of Vehicles may be referred to as an LTE-based Internet of Vehicles. The LTE-based Internet of Vehicles may classify networks into a macro network and a micro network. As shown in FIG. 1, an evolved NodeB (evolved node B, eNB) controls the macro network, and a serving node controls the micro network. When a vehicle enters an area covered by the macro network, the eNB provides access information of the serving node for the vehicle in a manner, for example, by broadcasting information or sending radio resource control (RRC) signaling, so that the vehicle can connect to the serving node according to the access information and camp on the micro network. The serving node is responsible for transmission resource allocation of the vehicle, and then, the vehicle may perform V2I/V2V communication by using a transmission resource of the micro network.

However, when the vehicle enters an area covered by no serving node, the vehicle selects a time-frequency resource for V2I/V2V communication by means of free contention. In this case, multiple vehicles may select a same time-frequency resource for communication, and a collision between transmission time-frequency resources may occur, thereby causing a V2I/V2V communication failure.

SUMMARY

Embodiments of the present invention provide a serving node establishment method and a device, so as to avoid a collision between transmission time-frequency resources of terminals, and increase a success rate of communication between the terminals.

According to a first aspect, an embodiment of the present invention provides a network device, including a sending unit, configured to send information about a micro network time-frequency resource pool to a terminal, where the information about the micro network time-frequency resource pool includes information about a time-frequency resource that is in a micro network and that is used to transmit exclusive information of a serving node. The sending unit is further configured to send measurement configuration information to the terminal, where the measurement configura-tion information includes a preset condition of at least one measurement event for triggering serving node establishment, the measurement configuration information is used to instruct the terminal to serve, when the terminal determines that the terminal meets a preset condition of a first measurement event, as a first serving node to send exclusive information of the first serving node on a first time-frequency resource in the micro network time-frequency resource pool according to the information about the micro network time-frequency resource pool, and the first measurement event is any one of the at least one measurement event for triggering serving node establishment.

In a first possible implementation of the first aspect, the exclusive information of the first serving node includes an identifier of the first serving node and information about a contention time-frequency resource pool of the first serving node.

With reference to the first aspect or the first possible implementation of the first aspect, in a second possible implementation of the first aspect, the preset condition of the first measurement event includes an idle time-frequency resource exists in the micro network time-frequency resource pool.

With reference to the second possible implementation of the first aspect, in a third possible implementation of the first aspect, that an idle time-frequency resource exists in the micro network time-frequency resource pool includes: a quantity of idle time-frequency resources in the micro network time-frequency resource pool is greater than a first preset quantity.

With reference to the second possible implementation of the first aspect or the third possible implementation of the first aspect, in a fourth possible implementation of the first aspect, the preset condition of the first measurement event further includes signal quality of a serving macro cell of the terminal is greater than first preset quality, or signal quality of a serving macro cell of the terminal is greater than first preset quality and the terminal is located in a preset area, or signal quality of a serving macro cell of the terminal is less than first preset quality and greater than second preset quality, and signal quality of a neighboring macro cell of the terminal is less than third preset quality, or a quantity of idle time-frequency resources in a contention resource pool available to the terminal is less than a second preset quantity, and signal quality of a serving macro cell of the terminal is greater than fourth preset quality, or a data sending failure count of the terminal is greater than a first preset count, or a buffer data volume of to-be-sent data of the terminal is greater than a preset data volume.

With reference to the fourth possible implementation of the first aspect, in a fifth possible implementation of the first aspect, the network device further includes, a receiving unit, configured to: after the sending unit sends the measurement configuration information to the terminal, receive a measurement report sent by the terminal, where the measurement report includes first indication information used to indicate that the terminal meets the preset condition of the first measurement event, and second indication information used to indicate usage of the micro network time-frequency resource pool, and a processing unit, configured to determine the first time-frequency resource from the micro network time-frequency resource pool according to the second indication information, where the sending unit is further configured to send configuration information of the first serving node to the terminal according to the first indication information, where the configuration information of the first serving node includes information about the first time-frequency resource, and information about a contention time-frequency resource pool available to the first serving node and/or information about a scheduling time-frequency resource pool available to the first serving node.

With reference to the fifth possible implementation of the first aspect, in a sixth possible implementation of the first aspect, the receiving unit is further configured to: after the sending unit sends the configuration information of the first serving node to the terminal, receive configuration acknowledgement information sent by the terminal, where the configuration acknowledgement information is used to indicate that the terminal has been configured as the first serving node.

With reference to the second possible implementation of the first aspect or the third possible implementation of the first aspect, in a seventh possible implementation of the first aspect, the preset condition of the first measurement event further includes signal quality of a serving macro cell of the terminal is less than fifth preset quality, and signal quality of a neighboring macro cell of the terminal is less than sixth preset quality, or a quantity of idle time-frequency resources in a contention resource pool available to the terminal is less than a third preset quantity, or a data sending failure count of the terminal is greater than a second preset count.

With reference to any one of the first aspect, or the first to the seventh possible implementations of the first aspect, in an eighth possible implementation of the first aspect, the micro network is a network that supports device-to-device (D2D) communication.

According to a second aspect, an embodiment of the present invention provides a terminal, including a receiving unit, configured to: receive information that is about a micro network time-frequency resource pool and that is sent by a network device, where the information about the micro network time-frequency resource pool includes information about a time-frequency resource that is in a micro network and that is used to transmit exclusive information of a serving node, and receive measurement configuration information sent by the network device, where the measurement configuration information includes a preset condition of at least one measurement event for triggering serving node establishment, a processing unit, configured to determine, according to the measurement configuration information, whether a preset condition of a first measurement event is met, and a sending unit, configured to: when the processing unit determines, according to the measurement configuration information, that the terminal meets the preset condition of the first measurement event, use the terminal as a first serving node to send exclusive information of the first serving node on a first time-frequency resource in the micro network time-frequency resource pool according to the information about the micro network time-frequency resource pool, where the first measurement event is any one of the at least one measurement event for triggering serving node establishment.

In a first possible implementation of the second aspect, the exclusive information of the first serving node includes an identifier of the first serving node and information about a contention time-frequency resource pool of the first serving node.

With reference to the second aspect or the first possible implementation of the second aspect, in a second possible implementation of the second aspect, the preset condition of the first measurement event includes: an idle time-frequency resource exists in the micro network time-frequency resource pool.

With reference to the second possible implementation of the second aspect, in a third possible implementation of the second aspect, that an idle time-frequency resource exists in the micro network time-frequency resource pool includes: a quantity of idle time-frequency resources in the micro network time-frequency resource pool is greater than a first preset quantity.

With reference to the second possible implementation of the second aspect or the third possible implementation of the second aspect, in a fourth possible implementation of the second aspect, the preset condition of the first measurement event further includes signal quality of a serving macro cell of the terminal is greater than first preset quality, or signal quality of a serving macro cell of the terminal is greater than first preset quality and the terminal is located in a preset area, or signal quality of a serving macro cell of the terminal is less than first preset quality and greater than second preset quality, and signal quality of a neighboring macro cell of the terminal is less than third preset quality, or a quantity of idle time-frequency resources in a contention resource pool available to the terminal is less than a second preset quantity, and signal quality of a serving macro cell of the terminal is greater than fourth preset quality, or a data sending failure count of the terminal is greater than a first preset count, or a buffer data volume of to-be-sent data of the terminal is greater than a preset data volume.

With reference to the fourth possible implementation of the second aspect, in a fifth possible implementation of the second aspect, the sending unit is specifically configured to: determine usage of the micro network time-frequency resource pool according to the information about the micro network time-frequency resource pool; send a measurement report to the network device, where the measurement report includes first indication information used to indicate that the terminal meets the preset condition of the first measurement event, and second indication information used to indicate the usage of the micro network time-frequency resource pool; receive configuration information of the first serving node that is sent by the network device, where the configuration information of the first serving node includes information about the first time-frequency resource, and information about a contention time-frequency resource pool available to the first serving node and/or information about a scheduling time-frequency resource pool available to the first serving node; and use the terminal as the first serving node to send the exclusive information of the first serving node on the first time-frequency resource according to the configuration information of the first serving node.

With reference to the fifth possible implementation of the second aspect, in a sixth possible implementation of the second aspect, the sending unit is further configured to send configuration acknowledgement information to the network device after using the terminal as the first serving node to send the configuration information of the first serving node on the first time-frequency resource according to the configuration information of the first serving node, where the configuration acknowledgement information is used to indicate that the terminal has been configured as the first serving node.

With reference to the second possible implementation of the second aspect or the third possible implementation of the second aspect, in a seventh possible implementation of the second aspect, the preset condition of the first measurement event further includes signal quality of a serving macro cell of the terminal is less than fifth preset quality, and signal quality of a neighboring macro cell of the terminal is less than sixth preset quality, or a quantity of idle time-frequency resources in a contention resource pool available to the terminal is less than a third preset quantity, or a data sending failure count of the terminal is greater than a second preset count.

With reference to the seventh possible implementation of the second aspect, in an eighth possible implementation of the second aspect, the sending unit is specifically configured to: determine the first time-frequency resource from an idle time-frequency resource in the micro network time-frequency resource pool according to the information about the micro network time-frequency resource pool, and use the terminal as the first serving node to send the exclusive information of the first serving node on the first time-frequency resource.

With reference to any one of the second aspect, or the first to the eighth possible implementations of the second aspect, in a ninth possible implementation of the second aspect, the micro network is a network that supports D2D communication.

According to a third aspect, an embodiment of the present invention provides a network device, including a processor and a transceiver, where the processor is configured to send information about a micro network time-frequency resource pool to a terminal by using the transceiver, where the information about the micro network time-frequency resource pool includes information about a time-frequency resource that is in a micro network and that is used to transmit exclusive information of a serving node, and the processor is further configured to send measurement configuration information to the terminal by using the transceiver, where the measurement configuration information includes a preset condition of at least one measurement event for triggering serving node establishment, the measurement configuration information is used to instruct the terminal to serve, when the terminal determines that the terminal meets a preset condition of a first measurement event, as a first serving node to send exclusive information of the first serving node on a first time-frequency resource in the micro network time-frequency resource pool, and the first measurement event is any one of the at least one measurement event for triggering serving node establishment.

In a first possible implementation of the third aspect, the exclusive information of the first serving node includes an identifier of the first serving node and information about a contention time-frequency resource pool of the first serving node.

With reference to the third aspect or the first possible implementation of the third aspect, in a second possible implementation of the third aspect, the preset condition of the first measurement event includes: an idle time-frequency resource exists in the micro network time-frequency resource pool.

With reference to the second possible implementation of the third aspect, in a third possible implementation of the third aspect, that an idle time-frequency resource exists in the micro network time-frequency resource pool includes: a quantity of idle time-frequency resources in the micro network time-frequency resource pool is greater than a first preset quantity.

With reference to the second possible implementation of the third aspect or the third possible implementation of the third aspect, in a fourth possible implementation of the third aspect, the preset condition of the first measurement event further includes signal quality of a serving macro cell of the terminal is greater than first preset quality, or signal quality of a serving macro cell of the terminal is greater than first preset quality and the terminal is located in a preset area, or signal quality of a serving macro cell of the terminal is less than first preset quality and greater than second preset quality, and signal quality of a neighboring macro cell of the terminal is less than third preset quality, or a quantity of idle time-frequency resources in a contention resource pool available to the terminal is less than a second preset quantity, and signal quality of a serving macro cell of the terminal is greater than fourth preset quality, or a data sending failure count of the terminal is greater than a first preset count, or a buffer data volume of to-be-sent data of the terminal is greater than a preset data volume.

With reference to the fourth possible implementation of the third aspect, in a fifth possible implementation of the third aspect, the processor is further configured to: after sending the measurement configuration information to the terminal by using the transceiver, receive, by using the transceiver, a measurement report sent by the terminal, where the measurement report includes first indication information used to indicate that the terminal meets the preset condition of the first measurement event, and second indication information used to indicate usage of the micro network time-frequency resource pool; determine the first time-frequency resource from the micro network time-frequency resource pool according to the second indication information; and send configuration information of the first serving node to the terminal according to the first indication information by using the transceiver, where the configuration information of the first serving node includes information about the first time-frequency resource, and information about a contention time-frequency resource pool available to the first serving node and/or information about a scheduling time-frequency resource pool available to the first serving node.

With reference to the fifth possible implementation of the third aspect, in a sixth possible implementation of the third aspect, the processor is further configured to: after sending the configuration information of the first serving node to the terminal by using the transceiver, receive, by using the transceiver, configuration acknowledgement information sent by the terminal, where the configuration acknowledgement information is used to indicate that the terminal has been configured as the first serving node.

With reference to the second possible implementation of the third aspect or the third possible implementation of the third aspect, in a seventh possible implementation of the third aspect, the preset condition of the first measurement event further includes signal quality of a serving macro cell of the terminal is less than fifth preset quality, and signal quality of a neighboring macro cell of the terminal is less than sixth preset quality, or a quantity of idle time-frequency resources in a contention resource pool available to the terminal is less than a third preset quantity, or a data sending failure count of the terminal is greater than a second preset count.

With reference to any one of the third aspect, or the first to the seventh possible implementations of the third aspect, in an eighth possible implementation of the third aspect, the micro network is a network that supports D2D communication.

According to a fourth aspect, an embodiment of the present invention provides a terminal, including a processor and a transceiver, where the processor is configured to receive, by using the transceiver, information that is about a micro network time-frequency resource pool and that is sent by a network device, where the information about the micro network time-frequency resource pool includes information about a time-frequency resource that is in a micro network and that is used to transmit exclusive information of a serving node, receive, by using the transceiver, measurement configuration information sent by the network device, where the measurement configuration information includes a preset condition of at least one measurement event for triggering serving node establishment; and when it is determined, according to the measurement configuration information, that the terminal meets a preset condition of a first measurement event, use the terminal as a first serving node to send, by using the transceiver, exclusive information of the first serving node on a first time-frequency resource in the micro network time-frequency resource pool according to the information about the micro network time-frequency resource pool, where the first measurement event is any one of the at least one measurement event for triggering serving node establishment.

In a first possible implementation of the fourth aspect, the exclusive information of the first serving node includes an identifier of the first serving node and information about a contention time-frequency resource pool of the first serving node.

With reference to the fourth aspect or the first possible implementation of the fourth aspect, in a second possible implementation of the fourth aspect, the preset condition of the first measurement event includes: an idle time-frequency resource exists in the micro network time-frequency resource pool.

With reference to the second possible implementation of the fourth aspect, in a third possible implementation of the fourth aspect, that an idle time-frequency resource exists in the micro network time-frequency resource pool includes: a quantity of idle time-frequency resources in the micro network time-frequency resource pool is greater than a first preset quantity.

With reference to the second possible implementation of the fourth aspect or the third possible implementation of the fourth aspect, in a fourth possible implementation of the fourth aspect, the preset condition of the first measurement event further includes signal quality of a serving macro cell of the terminal is greater than first preset quality, or signal quality of a serving macro cell of the terminal is greater than first preset quality and the terminal is located in a preset area, or signal quality of a serving macro cell of the terminal is less than first preset quality and greater than second preset quality, and signal quality of a neighboring macro cell of the terminal is less than third preset quality, or a quantity of idle time-frequency resources in a contention resource pool available to the terminal is less than a second preset quantity, and signal quality of a serving macro cell of the terminal is greater than fourth preset quality, or a data sending failure count of the terminal is greater than a first preset count, or a buffer data volume of to-be-sent data of the terminal is greater than a preset data volume.

With reference to the fourth possible implementation of the fourth aspect, in a fifth possible implementation of the fourth aspect, when using the terminal as the first serving node to send, by using the transceiver, the exclusive information of the first serving node on the first time-frequency resource in the micro network time-frequency resource pool according to the information about the micro network time-frequency resource pool, the processor is specifically configured to: determine usage of the micro network time-frequency resource pool according to the information about the micro network time-frequency resource pool; send a measurement report to the network device by using the transceiver, where the measurement report includes first indication information used to indicate that the terminal meets the preset condition of the first measurement event, and second indication information used to indicate the usage of the micro network time-frequency resource pool; receive, by using the transceiver, configuration information of the first serving node that is sent by the network device, where the configuration information of the first serving node includes information about the first time-frequency resource, and information about a contention time-frequency resource pool available to the first serving node and/or information about a scheduling time-frequency resource pool available to the first serving node; and use the terminal as the first serving node to send, by using the transceiver, the exclusive information of the first serving node on the first time-frequency resource according to the configuration information of the first serving node.

With reference to the fifth possible implementation of the fourth aspect, in a sixth possible implementation of the fourth aspect, after using the terminal as the first serving node to send, by using the transceiver, the configuration information of the first serving node on the first time-frequency resource according to the configuration information of the first serving node, the processor is further configured to send configuration acknowledgement information to the network device by using the transceiver, where the configuration acknowledgement information is used to indicate that the terminal has been configured as the first serving node.

With reference to the second possible implementation of the fourth aspect or the third possible implementation of the fourth aspect, in a seventh possible implementation of the fourth aspect, the preset condition of the first measurement event further includes signal quality of a serving macro cell of the terminal is less than fifth preset quality, and signal quality of a neighboring macro cell of the terminal is less than sixth preset quality, or a quantity of idle time-frequency resources in a contention resource pool available to the terminal is less than a third preset quantity, or a data sending failure count of the terminal is greater than a second preset count.

With reference to the seventh possible implementation of the fourth aspect, in an eighth possible implementation of the fourth aspect, when using the terminal as the first serving node to send, by using the transceiver, the exclusive information of the first serving node on the first time-frequency resource in the micro network time-frequency resource pool according to the information about the micro network time-frequency resource pool, the processor is specifically configured to: determine the first time-frequency resource from an idle time-frequency resource in the micro network time-frequency resource pool according to the information about the micro network time-frequency resource pool, and use the terminal as the first serving node to send the exclusive information of the first serving node on the first time-frequency resource by using the transceiver.

With reference to any one of the fourth aspect, or the first to the eighth possible implementations of the fourth aspect, in a ninth possible implementation of the fourth aspect, the micro network is a network that supports D2D communication.

According to a fifth aspect, an embodiment of the present invention provides a serving node establishment method, including sending, by a network device, information about a micro network time-frequency resource pool to a terminal, where the information about the micro network time-frequency resource pool includes information about a time-frequency resource that is in a micro network and that is used to transmit exclusive information of a serving node, and sending, by the network device, measurement configuration information to the terminal, where the measurement configuration information includes a preset condition of at least one measurement event for triggering serving node establishment, the measurement configuration information is used to instruct the terminal to serve, when the terminal determines that the terminal meets a preset condition of a first measurement event, as a first serving node to send exclusive information of the first serving node on a first time-frequency resource in the micro network time-frequency resource pool according to the information about the micro network time-frequency resource pool, and the first measurement event is any one of the at least one measurement event for triggering serving node establishment.

In a first possible implementation of the fifth aspect, the exclusive information of the first serving node includes an identifier of the first serving node and information about a contention time-frequency resource pool of the first serving node.

With reference to the fifth aspect or the first possible implementation of the fifth aspect, in a second possible implementation of the fifth aspect, the preset condition of the first measurement event includes: an idle time-frequency resource exists in the micro network time-frequency resource pool.

With reference to the second possible implementation of the fifth aspect, in a third possible implementation of the fifth aspect, that an idle time-frequency resource exists in the micro network time-frequency resource pool includes: a quantity of idle time-frequency resources in the micro network time-frequency resource pool is greater than a first preset quantity.

With reference to the second possible implementation of the fifth aspect or the third possible implementation of the fifth aspect, in a fourth possible implementation of the fifth aspect, the preset condition of the first measurement event further includes signal quality of a serving macro cell of the terminal is greater than first preset quality, or signal quality of a serving macro cell of the terminal is greater than first preset quality and the terminal is located in a preset area, or signal quality of a serving macro cell of the terminal is less than first preset quality and greater than second preset quality, and signal quality of a neighboring macro cell of the terminal is less than third preset quality, or a quantity of idle time-frequency resources in a contention resource pool available to the terminal is less than a second preset quantity, and signal quality of a serving macro cell of the terminal is greater than fourth preset quality, or a data sending failure count of the terminal is greater than a first preset count, or a buffer data volume of to-be-sent data of the terminal is greater than a preset data volume.

With reference to the fourth possible implementation of the fifth aspect, in a fifth possible implementation of the fifth aspect, after the sending, by the network device, measurement configuration information to the terminal, the method further includes receiving, by the network device, a measurement report sent by the terminal, where the measurement report includes first indication information used to indicate that the terminal meets the preset condition of the first measurement event, and second indication information used to indicate usage of the micro network time-frequency resource pool, determining, by the network device, the first time-frequency resource from the micro network time-frequency resource pool according to the second indication information, and sending, by the network device, configuration information of the first serving node to the terminal according to the first indication information, where the configuration information of the first serving node includes information about the first time-frequency resource, and information about a contention time-frequency resource pool available to the first serving node and/or information about a scheduling time-frequency resource pool available to the first serving node.

With reference to the fifth possible implementation of the fifth aspect, in a sixth possible implementation of the fifth aspect, after the sending, by the network device, configuration information of the first serving node to the terminal according to the first indication information, the method further includes receiving, by the network device, configuration acknowledgement information sent by the terminal, where the configuration acknowledgement information is used to indicate that the terminal has been configured as the first serving node.

With reference to the second possible implementation of the fifth aspect or the third possible implementation of the fifth aspect, in a seventh possible implementation of the fifth aspect, the preset condition of the first measurement event further includes signal quality of a serving macro cell of the terminal is less than fifth preset quality, and signal quality of a neighboring macro cell of the terminal is less than sixth preset quality, or a quantity of idle time-frequency resources in a contention resource pool available to the terminal is less than a third preset quantity, or a data sending failure count of the terminal is greater than a second preset count.

With reference to any one of the fifth aspect, or the first to the seventh possible implementations of the fifth aspect, in an eighth possible implementation of the fifth aspect, the micro network is a network that supports D2D communication.

According to a sixth aspect, an embodiment of the present invention provides a serving node establishment method, including receiving, by a terminal, information that is about a micro network time-frequency resource pool and that is sent by a network device, where the information about the micro network time-frequency resource pool includes information about a time-frequency resource that is in a micro network and that is used to transmit exclusive information of a serving node, receiving, by the terminal, measurement configuration information sent by the network device, where the measurement configuration information includes a preset condition of at least one measurement event for triggering serving node establishment, and when the terminal determines, according to the measurement configuration information, that the terminal meets a preset condition of a first measurement event, serving, by the terminal, as a first serving node to send exclusive information of the first serving node on a first time-frequency resource in the micro network time-frequency resource pool according to the information about the micro network time-frequency resource pool, where the first measurement event is any one of the at least one measurement event for triggering serving node establishment.

In a first possible implementation of the sixth aspect, the exclusive information of the first serving node includes an identifier of the first serving node and information about a contention time-frequency resource pool of the first serving node.

With reference to the sixth aspect or the first possible implementation of the sixth aspect, in a second possible implementation of the sixth aspect, the preset condition of the first measurement event includes an idle time-frequency resource exists in the micro network time-frequency resource pool.

With reference to the second possible implementation of the sixth aspect, in a third possible implementation of the sixth aspect, that an idle time-frequency resource exists in the micro network time-frequency resource pool includes: a quantity of idle time-frequency resources in the micro network time-frequency resource pool is greater than a first preset quantity.

With reference to the second possible implementation of the sixth aspect or the third possible implementation of the sixth aspect, in a fourth possible implementation of the sixth aspect, the preset condition of the first measurement event further includes signal quality of a serving macro cell of the terminal is greater than first preset quality, or signal quality of a serving macro cell of the terminal is greater than first preset quality and the terminal is located in a preset area, or signal quality of a serving macro cell of the terminal is less than first preset quality and greater than second preset quality, and signal quality of a neighboring macro cell of the terminal is less than third preset quality or a quantity of idle time-frequency resources in a contention resource pool available to the terminal is less than a second preset quantity, and signal quality of a serving macro cell of the terminal is greater than fourth preset quality, or a data sending failure count of the terminal is greater than a first preset count, or a buffer data volume of to-be-sent data of the terminal is greater than a preset data volume.

With reference to the fourth possible implementation of the sixth aspect, in a fifth possible implementation of the sixth aspect, the serving, by the terminal, as a first serving node to send exclusive information of the first serving node on a first time-frequency resource in the micro network time-frequency resource pool according to the information about the micro network time-frequency resource pool includes determining, by the terminal, usage of the micro network time-frequency resource pool according to the information about the micro network time-frequency resource pool, sending, by the terminal, a measurement report to the network device, where the measurement report includes first indication information used to indicate that the terminal meets the preset condition of the first measurement event, and second indication information used to indicate the usage of the micro network time-frequency resource pool, receiving, by the terminal, configuration information of the first serving node that is sent by the network device, where the configuration information of the first serving node includes information about the first time-frequency resource, and information about a contention time-frequency resource pool available to the first serving node and/or information about a scheduling time-frequency resource pool available to the first serving node, and serving, by the terminal, as the first serving node to send the exclusive information of the first serving node on the first time-frequency resource according to the configuration information of the first serving node.

With reference to the fifth possible implementation of the sixth aspect, in a sixth possible implementation of the sixth aspect, after the serving, by the terminal, as the first serving node to send the control information of the first serving node on the first time-frequency resource according to configuration information of the first serving node, the method further includes sending, by the terminal, configuration acknowledgement information to the network device, where the configuration acknowledgement information is used to indicate that the terminal has been configured as the first serving node.

With reference to the second possible implementation of the sixth aspect or the third possible implementation of the sixth aspect, in a seventh possible implementation of the sixth aspect, the preset condition of the first measurement event further includes signal quality of a serving macro cell of the terminal is less than fifth preset quality, and signal quality of a neighboring macro cell of the terminal is less than sixth preset quality, or a quantity of idle time-frequency resources in a contention resource pool available to the terminal is less than a third preset quantity, or a data sending failure count of the terminal is greater than a second preset count.

With reference to the seventh possible implementation of the sixth aspect, in an eighth possible implementation of the sixth aspect, the serving, by the terminal, as a first serving node to send exclusive information of the first serving node on a first time-frequency resource in the micro network time-frequency resource pool according to the information about the micro network time-frequency resource pool includes determining, by the terminal, the first time-frequency resource from an idle time-frequency resource in the micro network time-frequency resource pool according to the information about the micro network time-frequency resource pool, and serving, by the terminal, as the first serving node to send the exclusive information of the first serving node on the first time-frequency resource.

With reference to any one of the sixth aspect, or the first to the eighth possible implementations of the sixth aspect, in a ninth possible implementation of the sixth aspect, the micro network is a network that supports D2D communication.

According to the serving node establishment method and the device provided in the embodiments of the present invention, a network device sends information about a micro network time-frequency resource pool to a terminal and sends measurement configuration information to the terminal. The information about the micro network time-frequency resource pool includes information about a time-frequency resource that is in a micro network and that is used to transmit exclusive information of a serving node. The measurement configuration information includes a preset condition of at least one measurement event for triggering serving node establishment. The measurement configuration information is used to instruct the terminal to serve, when the terminal determines that the terminal meets a preset condition of a first measurement event, as a first serving node to send exclusive information of the first serving node on a first time-frequency resource in the micro network time-frequency resource pool according to the information about the micro network time-frequency resource pool. Therefore, the terminal can serve as the first serving node and can schedule a transmission time-frequency resource of another terminal connected to the terminal, so that a collision between transmission time-frequency resources of terminals can be avoided, and a success rate of communication between the terminals can be increased.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

FIG. 4 is a schematic structural diagram of Embodiment 1 of a terminal according to the present invention;

FIG. 5 is a schematic structural diagram of Embodiment 2 of a terminal according to the present invention;

FIG. 6 is a flowchart of Embodiment 1 of a serving node establishment method according to the present invention;

DETAILED DESCRIPTION OF ILLUSTRATIVE EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

A network device mentioned in the embodiments of the present invention may be, for example, an eNB, and a terminal may be, for example, a vehicle.

Figure 1:
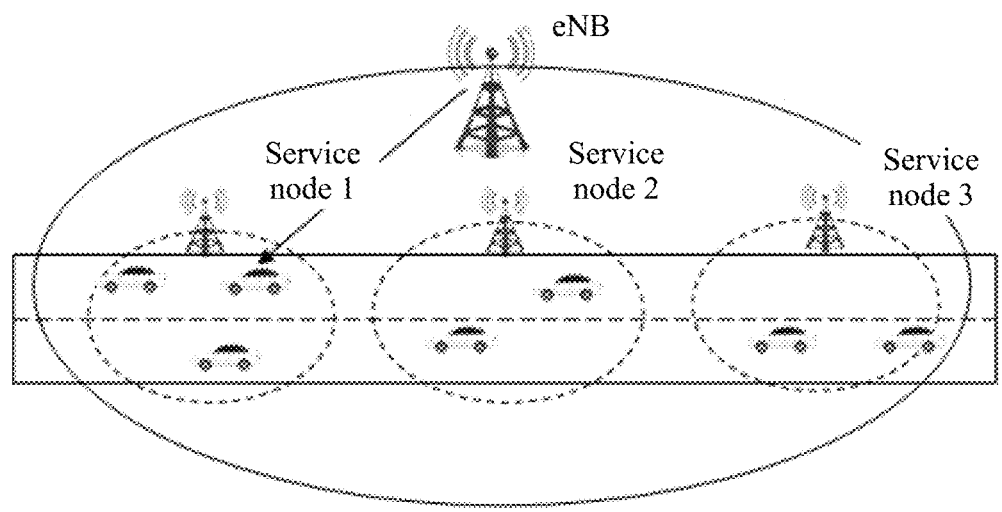
FIG. 1 is a schematic diagram of an LTE-based Internet of Vehicles in the prior art.
Figure 2:
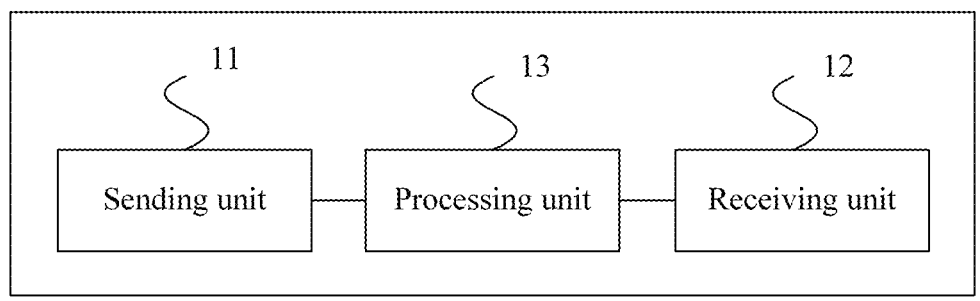
FIG. 2 is a schematic structural diagram of Embodiment 1 of a network device according to the present invention.

FIG. 2 is a schematic structural diagram of Embodiment 1 of a network device according to the present invention. As shown in FIG. 2, the network device in this embodiment may include a sending unit 11. The sending unit 11 is configured to send information about a micro network time-frequency resource pool to a terminal. The information about the micro network time-frequency resource pool includes information about a time-frequency resource that is in a micro network and that is used to transmit exclusive information of a serving node. The sending unit 11 is further configured to send measurement configuration information to the terminal. The measurement configuration information includes a preset condition of at least one measurement event for triggering serving node establishment. The measurement configuration information is used to instruct the terminal to serve, when the terminal determines that the terminal meets a preset condition of a first measurement event, as a first serving node to send exclusive information of the first serving node on a first time-frequency resource in the micro network time-frequency resource pool according to the information about the micro network time-frequency resource pool. The first measurement event is any one of the at least one measurement event for triggering serving node establishment.

In this embodiment, a sending unit 11 sends information about a micro network time-frequency resource pool to a terminal that falls within signal coverage of the network device. The micro network time-frequency resource pool includes a time-frequency resource that is in a micro network and that is used to transmit exclusive information of a serving node. The information about the micro network time-frequency resource pool includes information about the time-frequency resource used to transmit exclusive information of a serving node. The exclusive information of the serving node may include identifier information of the serving node and information about a contention time-frequency resource pool available to the serving node. The contention time-frequency resource pool available to the serving node indicates a contention time-frequency resource pool that is available after the terminal is connected to the serving node. The sending unit 11 may further send measurement configuration information to the terminal. The measurement configuration information includes a preset condition of at least one measurement event for triggering serving node establishment. After receiving the measurement configuration information sent by the network device, when determining, according to the measurement configuration information, that the terminal meets a preset condition of a first measurement event, the terminal serves as a first serving node to send (for example, broadcast) exclusive information of the first serving node on a first time-frequency resource in the micro network time-frequency resource pool according to the information about the micro network time-frequency resource pool. The first measurement event may be any measurement event in a set of the at least one measurement event for triggering serving node establishment.

Optionally, the exclusive information of the first serving node includes an identifier of the first serving node and information about a contention time-frequency resource pool of the first serving node.

Optionally, the preset condition of the first measurement event includes: an idle time-frequency resource exists in the micro network time-frequency resource pool. Because an idle time-frequency resource exists in the micro network time-frequency resource pool, the terminal can serve as the first serving node and can schedule a transmission time-frequency resource of another terminal connected to the terminal.

It should be noted that the sending unit 11 may send the information about the micro network time-frequency resource pool and the measurement configuration information to the terminal by using a same message or different messages.

Optionally, that an idle time-frequency resource exists in the micro network time-frequency resource pool includes: a quantity of idle time-frequency resources in the micro network time-frequency resource pool is greater than a first preset quantity; or a quantity of non-idle time-frequency resources in the micro network time-frequency resource pool is less than a preset quantity; or a percentage of idle time-frequency resources in the micro network time-frequency resource pool is greater than a first percentage; or a percentage of non-idle time-frequency resources in the micro network time-frequency resource pool is less than a second percentage.

In a first optional implementation, the preset condition of the first measurement event further includes signal quality of a serving macro cell of the terminal is greater than first preset quality, or signal quality of a serving macro cell of the terminal is greater than first preset quality and the terminal is located in a preset area, or signal quality of a serving macro cell of the terminal is less than first preset quality and greater than second preset quality, and signal quality of a neighboring macro cell of the terminal is less than third preset quality, or a quantity of idle time-frequency resources in a contention resource pool available to the terminal is less than a second preset quantity, and signal quality of a serving macro cell of the terminal is greater than fourth preset quality, or a data sending failure count of the terminal is greater than a first preset count, or a buffer data volume of to-be-sent data of the terminal is greater than a preset data volume.

Optionally, the network device in this embodiment may further include a receiving unit 12 and a processing unit 13. After the sending unit 11 sends the measurement configuration information to the terminal, the receiving unit 12 is configured to receive a measurement report sent by the terminal. The measurement report includes first indication information used to indicate that the terminal meets the preset condition of the first measurement event, and second indication information used to indicate usage of the micro network time-frequency resource pool. The processing unit 13 is configured to determine the first time-frequency resource from the micro network time-frequency resource pool according to the second indication information. The sending unit 11 is further configured to send configuration information of the first serving node to the terminal according to the first indication information. The configuration information of the first serving node includes information about the first time-frequency resource, and information about a contention time-frequency resource pool available to the first serving node and/or information about a scheduling time-frequency resource pool available to the first serving node.

In this embodiment, when the terminal determines, according to information about a micro network time-frequency resource pool and a preset condition of at least one measurement event for triggering serving node establishment, that the terminal meets a preset condition of any one of the at least one measurement event for triggering serving node establishment, the any one measurement event is a first measurement event, and the terminal determines that the terminal needs to be configured as a first serving node. Then, the terminal determines usage of the micro network time-frequency resource pool, that is, determines an idle time-frequency resource and a non-idle time-frequency resource in the micro network time-frequency resource pool according to the information about the micro network time-frequency resource pool, and further sends a measurement report to the network device. The measurement report includes first indication information and second indication information. The first indication information is used to indicate that the terminal meets the preset condition of the first measurement event, and the second indication information is used to indicate the usage of the micro network time-frequency resource pool. After a receiving unit 12 of the network device receives the measurement report, a processing unit 13 determines the idle time-frequency resource in the micro network time-frequency resource pool according to the second indication information, and then determines a first time-frequency resource from the idle time-frequency resource. The first time-frequency resource is a time-frequency resource used to transmit exclusive information of the terminal serving as the first serving node. The sending unit 11 determines, according to the first indication information, that the terminal meets the preset condition of the first measurement event, so that the terminal can serve as the first serving node, and then sends configuration information of the terminal serving as the first serving node to the terminal. The configuration information of the first serving node includes information about the first time-frequency resource determined by the network device, and information about a contention time-frequency resource pool available to the first serving node and/or information about a scheduling time-frequency resource pool available to the first serving node. The contention time-frequency resource pool includes a time-frequency resource used for transmitting data by means of free contention by a terminal connected to the first serving node. The scheduling time-frequency resource includes a time-frequency resource that is scheduled by the first serving node and that is used for transmitting data by the terminal connected to the first serving node.

Optionally, after the sending unit 11 sends the configuration information of the first serving node to the terminal, the receiving unit 12 is further configured to receive configuration acknowledgement information sent by the terminal. The configuration acknowledgement information is used to indicate that the terminal has been configured as the first serving node. In this embodiment, after the terminal receives the configuration information of the first serving node that is sent by the network device, the terminal is configured as the first serving node, and then, the terminal sends the configuration acknowledgement information to the network device. After the receiving unit 12 of the network device receives the configuration acknowledgement information, the network device may determine that the terminal has been configured as the first serving node according to the configuration information of the first serving node.

In a second optional implementation solution, the preset condition of the first measurement event further includes signal quality of a serving macro cell of the terminal is less than fifth preset quality, and signal quality of a neighboring macro cell of the terminal is less than sixth preset quality, or a quantity of idle time-frequency resources in a contention resource pool available to the terminal is less than a third preset quantity, or a data sending failure count of the terminal is greater than a second preset count.

Optionally, the micro network is a network that supports device-to-device (D2D) communication.

According to the network device provided in this embodiment, a sending unit 11 sends information about a micro network time-frequency resource pool to a terminal and sends measurement configuration information to the terminal. The information about the micro network time-frequency resource pool includes information about a time-frequency resource used to transmit exclusive information of a serving node. The measurement configuration information includes a preset condition of at least one measurement event for triggering serving node establishment. The measurement configuration information is used to instruct the terminal to serve, when the terminal determines that the terminal meets a preset condition of a first measurement event, as a first serving node to send exclusive information of the first serving node on a first time-frequency resource in the micro network time-frequency resource pool according to the information about the micro network time-frequency resource pool. Therefore, the terminal can serve as the first serving node and can schedule a transmission time-frequency resource of another terminal connected to the terminal, so that a collision between transmission time-frequency resources of terminals can be avoided, and a success rate of communication between the terminals can be increased.

Figure 3:
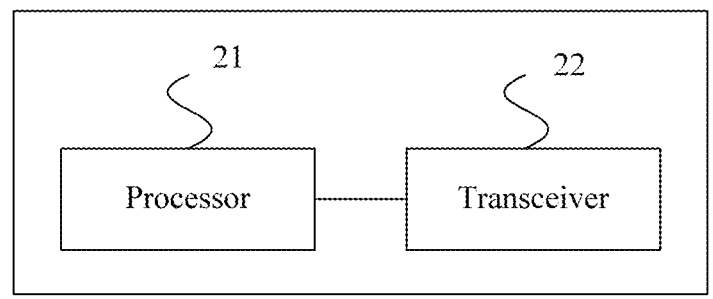
FIG. 3 is a schematic structural diagram of Embodiment 2 of a network device according to the present invention.

FIG. 3 is a schematic structural diagram of Embodiment 2 of a network device according to the present invention. As shown in FIG. 3, the network device in this embodiment may include a processor 21 and a transceiver 22. The processor 21 is configured to send information about a micro network time-frequency resource pool to a terminal by using the transceiver 22. The information about the micro network time-frequency resource pool includes information about a time-frequency resource that is in a micro network and that is used to transmit exclusive information of a serving node. The processor 21 is further configured to send measurement configuration information to the terminal by using the transceiver 22. The measurement configuration information includes a preset condition of at least one measurement event for triggering serving node establishment. The measurement configuration information is used to instruct the terminal to serve, when the terminal determines that the terminal meets a preset condition of a first measurement event, as a first serving node to send exclusive information of the first serving node on a first time-frequency resource in the micro network time-frequency resource pool according to the information about the micro network time-frequency resource pool. The first measurement event is any one of the at least one measurement event for triggering serving node establishment.

Optionally, the exclusive information of the first serving node includes an identifier of the first serving node and information about a contention time-frequency resource pool of the first serving node.

Optionally, the preset condition of the first measurement event includes: an idle time-frequency resource exists in the micro network time-frequency resource pool.

Optionally, that an idle time-frequency resource exists in the micro network time-frequency resource pool includes: a quantity of idle time-frequency resources in the micro network time-frequency resource pool is greater than a first preset quantity.

In a first optional implementation solution, the preset condition of the first measurement event further includes signal quality of a serving macro cell of the terminal is greater than first preset quality, or signal quality of a serving macro cell of the terminal is greater than first preset quality and the terminal is located in a preset area, or signal quality of a serving macro cell of the terminal is less than first preset quality and greater than second preset quality, and signal quality of a neighboring macro cell of the terminal is less than third preset quality, or a quantity of idle time-frequency resources in a contention resource pool available to the terminal is less than a second preset quantity, and signal quality of a serving macro cell of the terminal is greater than fourth preset quality, or a data sending failure count of the terminal is greater than a first preset count, or a buffer data volume of to-be-sent data of the terminal is greater than a preset data volume.

Optionally, the processor 21 is further configured to: after sending the measurement configuration information to the terminal by using the transceiver 22, receive, by using the transceiver 22, a measurement report sent by the terminal, where the measurement report includes first indication information used to indicate that the terminal meets the preset condition of the first measurement event, and second indication information used to indicate usage of the micro network time-frequency resource pool; determine the first time-frequency resource from the micro network time-frequency resource pool according to the second indication information; and send configuration information of the first serving node to the terminal according to the first indication information by using the transceiver 22. The configuration information of the first serving node includes information about the first time-frequency resource, and information about a contention time-frequency resource pool available to the first serving node and/or information about a scheduling time-frequency resource pool available to the first serving node.

Optionally, the processor 21 is further configured to: after sending the configuration information of the first serving node to the terminal by using the transceiver 22, receive, by using the transceiver 22, configuration acknowledgement information sent by the terminal. The configuration acknowledgement information is used to indicate that the terminal has been configured as the first serving node according to the configuration information of the first serving node.

In a second optional implementation solution, the preset condition of the first measurement event further includes signal quality of a serving macro cell of the terminal is less than fifth preset quality, and signal quality of a neighboring macro cell of the terminal is less than sixth preset quality, or a quantity of idle time-frequency resources in a contention resource pool available to the terminal is less than a third preset quantity, or a data sending failure count of the terminal is greater than a second preset count.

Optionally, the micro network is a network that supports D2D communication.

For an implementation principle and a technical effect of the network device in this embodiment, refer to related records in Embodiment 1 of a network device in the present invention. Details are not described herein again.

FIG. 4 is a schematic structural diagram of Embodiment 1 of a terminal according to the present invention. As shown in FIG. 4, the terminal in this embodiment may include a receiving unit 31 and a processing unit 32. The receiving unit 31 is configured to: receive information that is about a micro network time-frequency resource pool and that is sent by a network device, where the information about the micro network time-frequency resource pool includes information about a time-frequency resource that is in a micro network and that is used to transmit exclusive information of a serving node; and receive measurement configuration information sent by the network device. The measurement configuration information includes a preset condition of at least one measurement event for triggering serving node establishment. The processing unit 32 is configured to determine, according to the measurement configuration information, whether a preset condition of a first measurement event is met. A sending unit 33 is configured to: when the processing unit 32 determines, according to the measurement configuration information, that the terminal meets the preset condition of the first measurement event, use the terminal as a first serving node to send exclusive information of the first serving node on a first time-frequency resource in the micro network time-frequency resource pool according to the information about the micro network time-frequency resource pool. The first measurement event is any one of the at least one measurement event for triggering serving node establishment.

It should be noted that the receiving unit 31 may receive, by using a same message or different messages, the information about the micro network time-frequency resource pool and the measurement configuration information that are sent by the network device.

In this embodiment, after the receiving unit 31 receives the measurement configuration information, the processing unit 32 may determine, according to a preset condition of each measurement event, that the terminal meets a preset condition of which measurement event, for example, the terminal meets the preset condition of the first measurement event. Then, the sending unit 33 uses the terminal as the first serving node to send (for example, broadcast) the exclusive information of the first serving node on the first time-frequency resource in the micro network time-frequency resource pool according to the information about the micro network time-frequency resource pool. A terminal that receives the exclusive information of the first serving node may connect to the first serving node, so as to transmit data under scheduling of the first serving node. Optionally, the exclusive information of the first serving node includes an identifier of the first serving node and information about a contention time-frequency resource pool of the first serving node, so that another terminal can determine, according to the exclusive information of the first serving node, a serving node for access, and after connecting to the first serving node, can transmit data according to the information about the contention time-frequency resource pool or by means of free contention.

Optionally, the preset condition of the first measurement event includes: an idle time-frequency resource exists in the micro network time-frequency resource pool.

Optionally, that an idle time-frequency resource exists in the micro network time-frequency resource pool includes: a quantity of idle time-frequency resources in the micro network time-frequency resource pool is greater than a first preset quantity; or a quantity of non-idle time-frequency resources in the micro network time-frequency resource pool is less than a preset quantity; or a percentage of idle time-frequency resources in the micro network time-frequency resource pool is greater than a first percentage; or a percentage of non-idle time-frequency resources in the micro network time-frequency resource pool is less than a second percentage.

In a first optional implementation solution, the preset condition of the first measurement event further includes signal quality of a serving macro cell of the terminal is greater than first preset quality, or signal quality of a serving macro cell of the terminal is greater than first preset quality and the terminal is located in a preset area, or signal quality of a serving macro cell of the terminal is less than first preset quality and greater than second preset quality, and signal quality of a neighboring macro cell of the terminal is less than third preset quality, or a quantity of idle time-frequency resources in a contention resource pool available to the terminal is less than a second preset quantity, and signal quality of a serving macro cell of the terminal is greater than fourth preset quality, or a data sending failure count of the terminal is greater than a first preset count, or a buffer data volume of to-be-sent data of the terminal is greater than a preset data volume.

Optionally, the sending unit 33 is specifically configured to: determine usage of the micro network time-frequency resource pool according to the information about the micro network time-frequency resource pool; send a measurement report to the network device, where the measurement report includes first indication information used to indicate that the terminal meets the preset condition of the first measurement event, and second indication information used to indicate the usage of the micro network time-frequency resource pool; receive configuration information of the first serving node that is sent by the network device, where the configuration information of the first serving node includes information about the first time-frequency resource, and information about a contention time-frequency resource pool available to the first serving node and/or information about a scheduling time-frequency resource pool available to the first serving node; and use the terminal as the first serving node to send the exclusive information of the first serving node on the first time-frequency resource according to the configuration information of the first serving node.

In this embodiment, when a processing unit 32 of the terminal determines, according to a preset condition of at least one measurement event for triggering serving node establishment, that the terminal meets a preset condition of any one of the at least one measurement event for triggering serving node establishment, the any one measurement event is a first measurement event, and a sending unit 33 may use the terminal as a first serving node. Then, the terminal determines usage of the micro network time-frequency resource pool, that is, determines an idle time-frequency resource and a non-idle time-frequency resource in the micro network time-frequency resource pool according to information about the micro network time-frequency resource pool, and further sends a measurement report to a network device. The measurement report includes first indication information and second indication information. The first indication information is used to indicate that the terminal meets the preset condition of the first measurement event, and the second indication information is used to indicate the usage of the micro network time-frequency resource pool. After receiving the measurement report, the network device determines the idle time-frequency resource in the micro network time-frequency resource pool according to the second indication information, and then determines a first time-frequency resource from the idle time-frequency resource. The first time-frequency resource is a time-frequency resource used to transmit exclusive information of the terminal serving as the first serving node. The network device determines, according to the first indication information, that the terminal meets the preset condition of the first measurement event, so that the terminal can serve as the first serving node. The network device may send, to the terminal, configuration information of the terminal serving as the first serving node. The configuration information of the first serving node includes information about the first time-frequency resource determined by the network device, and information about a contention time-frequency resource pool available to the first serving node and/or information about a scheduling time-frequency resource pool available to the first serving node. The contention time-frequency resource pool includes a time-frequency resource used for transmitting data by means of free contention by a terminal connected to the first serving node. The scheduling time-frequency resource includes a time-frequency resource that is scheduled by the first serving node and that is used for transmitting data by the terminal connected to the first serving node. After the sending unit 33 receives the configuration information of the first serving node, the sending unit 33 uses the terminal as the first serving node to send the exclusive information of the first serving node on the first time-frequency resource according to the configuration information of the first serving node.

Optionally, the sending unit 33 is further configured to send configuration acknowledgement information to the network device after using the terminal as the first serving node to send the configuration information of the first serving node on the first time-frequency resource according to the configuration information of the first serving node. The configuration acknowledgement information is used to indicate that the terminal has been configured as the first serving node. In this embodiment, the sending unit 33 may further send the configuration acknowledgement information to the network device. The configuration acknowledgement information is used to indicate that the terminal has been configured as the first serving node.

In a second optional implementation, the preset condition of the first measurement event further includes signal quality of a serving macro cell of the terminal is less than fifth preset quality, and signal quality of a neighboring macro cell of the terminal is less than sixth preset quality, or a quantity of idle time-frequency resources in a contention resource pool available to the terminal is less than a third preset quantity, or a data sending failure count of the terminal is greater than a second preset count.

Optionally, the sending unit 33 is specifically configured to: determine the first time-frequency resource from an idle time-frequency resource in the micro network time-frequency resource pool according to the information about the micro network time-frequency resource pool, and use the terminal as the first serving node to send the exclusive information of the first serving node on the first time-frequency resource.

In this embodiment, when the processing unit 32 determines, according to the preset condition of the at least one measurement event for triggering serving node establishment, that the terminal meets the preset condition of the first measurement event, the sending unit 33 may determine the first time-frequency resource from the idle time-frequency resource in the micro network time-frequency resource pool. The first time-frequency resource is a time-frequency resource used to transmit the exclusive information of the terminal serving as the first serving node. Then, the sending unit 33 uses the terminal as the first serving node to send the exclusive information of the first serving node on the determined first time-frequency resource, so that another terminal that receives the exclusive information of the first serving node connects to the first serving node, and the first serving node can schedule a time-frequency resource used for transmitting data by the another terminal connected to the first serving node.

Optionally, the micro network is a network that supports D2D communication.

According to the terminal provided in this embodiment, a receiving unit 31 receives information that is about a micro network time-frequency resource pool and that is sent by a network device, and receives measurement configuration information sent by the network device. The information about the micro network time-frequency resource pool includes information about a time-frequency resource that is in a micro network and that is used to transmit exclusive information of a serving node. The measurement configuration information includes a preset condition of at least one measurement event for triggering serving node establishment. When a processing unit 32 determines, according to the information about the micro network time-frequency resource pool, that the terminal meets a preset condition of a first measurement event, a sending unit 33 uses the terminal as a first serving node to send exclusive information of the first serving node on a first time-frequency resource in the micro network time-frequency resource pool according to the information about the micro network time-frequency resource pool. Therefore, the terminal can serve as the first serving node and can schedule a transmission time-frequency resource of another terminal connected to the terminal, so that a collision between transmission time-frequency resources of terminals can be avoided, and a success rate of communication between the terminals can be increased.

FIG. 5 is a schematic structural diagram of Embodiment 2 of a terminal according to the present invention. As shown in FIG. 5, the terminal in this embodiment may include a processor 41 and a transceiver 42. The processor 41 is configured to: receive, by using the transceiver 42, information that is about a micro network time-frequency resource pool and that is sent by a network device, where the information about the micro network time-frequency resource pool includes information about a time-frequency resource that is in a micro network and that is used to transmit exclusive information of a serving node; receive, by using the transceiver 42, measurement configuration information sent by the network device, where the measurement configuration information includes a preset condition of at least one measurement event for triggering serving node establishment; and when it is determined, according to the measurement configuration information, that the terminal meets a preset condition of a first measurement event, use the terminal as a first serving node to send, by using the transceiver 42, exclusive information of the first serving node on a first time-frequency resource in the micro network time-frequency resource pool according to the information about the micro network time-frequency resource pool, where the first measurement event is any one of the at least one measurement event for triggering serving node establishment.

Optionally, the exclusive information of the first serving node includes an identifier of the first serving node and information about a contention time-frequency resource pool of the first serving node.

Optionally, the preset condition of the first measurement event includes: an idle time-frequency resource exists in the micro network time-frequency resource pool.

Optionally, that an idle time-frequency resource exists in the micro network time-frequency resource pool includes: a quantity of idle time-frequency resources in the micro network time-frequency resource pool is greater than a first preset quantity.

In a first optional implementation solution, the preset condition of the first measurement event further includes signal quality of a serving macro cell of the terminal is greater than first preset quality, or signal quality of a serving macro cell of the terminal is greater than first preset quality and the terminal is located in a preset area, or signal quality of a serving macro cell of the terminal is less than first preset quality and greater than second preset quality, and signal quality of a neighboring macro cell of the terminal is less than third preset quality, or a quantity of idle time-frequency resources in a contention resource pool available to the terminal is less than a second preset quantity, and signal quality of a serving macro cell of the terminal is greater than fourth preset quality, or a data sending failure count of the terminal is greater than a first preset count, or a buffer data volume of to-be-sent data of the terminal is greater than a preset data volume.

Optionally, when using the terminal as the first serving node to send, by using the transceiver 42, the exclusive information of the first serving node on the first time-frequency resource in the micro network time-frequency resource pool according to the information about the micro network time-frequency resource pool, the processor 41 is specifically configured to: determine usage of the micro network time-frequency resource pool according to the information about the micro network time-frequency resource pool; send a measurement report to the network device by using the transceiver 42, where the measurement report includes first indication information used to indicate that the terminal meets the preset condition of the first measurement event, and second indication information used to indicate the usage of the micro network time-frequency resource pool; receive, by using the transceiver 42, configuration information of the first serving node that is sent by the network device, where the configuration information of the first serving node includes information about the first time-frequency resource, and information about a contention time-frequency resource pool available to the first serving node and/or information about a scheduling time-frequency resource pool available to the first serving node; and use the terminal as the first serving node to send, by using the transceiver 42, the exclusive information of the first serving node on the first time-frequency resource according to the configuration information of the first serving node.

Optionally, after using the terminal as the first serving node to send, by using the transceiver 42, the configuration information of the first serving node on the first time-frequency resource according to the configuration information of the first serving node, the processor 41 is further configured to send configuration acknowledgement information to the network device by using the transceiver 42, where the configuration acknowledgement information is used to indicate that the terminal has been configured as the first serving node.

In a second optional implementation solution, the preset condition of the first measurement event further includes signal quality of a serving macro cell of the terminal is less than fifth preset quality, and signal quality of a neighboring macro cell of the terminal is less than sixth preset quality, or a quantity of idle time-frequency resources in a contention resource pool available to the terminal is less than a third preset quantity, or a data sending failure count of the terminal is greater than a second preset count.

Optionally, when using the terminal as the first serving node to send, by using the transceiver 42, the exclusive information of the first serving node on the first time-frequency resource in the micro network time-frequency resource pool according to the information about the micro network time-frequency resource pool, the processor 41 is specifically configured to: determine the first time-frequency resource from an idle time-frequency resource in the micro network time-frequency resource pool according to the information about the micro network time-frequency resource pool, and use the terminal as the first serving node to send the exclusive information of the first serving node on the first time-frequency resource by using the transceiver 42.

Optionally, the micro network is a network that supports D2D communication.

For an implementation principle and a technical effect of the terminal in this embodiment, refer to related records in Embodiment 1 of a terminal in the present invention. Details are not described herein again.

FIG. 6 is a flowchart of Embodiment 1 of a serving node establishment method according to the present invention. As shown in FIG. 6, the method in this embodiment may include the following steps.

S101. A network device sends information about a micro network time-frequency resource pool to a terminal, where the information about the micro network time-frequency resource pool includes information about a time-frequency resource that is in a micro network and that is used to transmit exclusive information of a serving node.

S102. The network device sends measurement configuration information to the terminal, where the measurement configuration information includes a preset condition of at least one measurement event for triggering serving node establishment, and the measurement configuration information is used to instruct the terminal to serve, when the terminal determines that the terminal meets a preset condition of a first measurement event, as a first serving node to send exclusive information of the first serving node on a first time-frequency resource in the micro network time-frequency resource pool according to the information about the micro network time-frequency resource pool.

In this embodiment, a network device sends information about a micro network time-frequency resource pool to a terminal that falls within signal coverage of the network device. The micro network time-frequency resource pool includes a time-frequency resource that is in a micro network and that is used to transmit exclusive information of a serving node. The information about the micro network time-frequency resource pool includes information about the time-frequency resource used to transmit exclusive information of a serving node. The exclusive information of the serving node may include identifier information of the serving node and information about a contention time-frequency resource pool available to the serving node. The contention time-frequency resource pool available to the serving node indicates a contention time-frequency resource pool that is available after the terminal is connected to the serving node.

The network device may further send measurement configuration information to the terminal. The measurement configuration information includes a preset condition of at least one measurement event for triggering serving node establishment. After receiving the measurement configuration information sent by the network device, when determining, according to the measurement configuration information, that the terminal meets a preset condition of a first measurement event, the terminal serves as a first serving node to send (for example, broadcast) exclusive information of the first serving node on a first time-frequency resource in the micro network time-frequency resource pool according to the information about the micro network time-frequency resource pool. The first measurement event may be any measurement event in a set of the at least one measurement event for triggering serving node establishment.

Optionally, the exclusive information of the first serving node includes an identifier of the first serving node and information about a contention time-frequency resource pool of the first serving node.

Optionally, the preset condition of the first measurement event includes: an idle time-frequency resource exists in the micro network time-frequency resource pool. Because an idle time-frequency resource exists in the micro network time-frequency resource pool, the terminal can serve as the first serving node and can schedule a transmission time-frequency resource of another terminal connected to the terminal.

It should be noted that there is no execution sequence between S101 and S102. Alternatively, the network device may add the information about the micro network time-frequency resource pool and the measurement configuration information to a same message or different messages and send the information about the micro network time-frequency resource pool and the measurement configuration information to the terminal.

Optionally, that an idle time-frequency resource exists in the micro network time-frequency resource pool includes: a quantity of idle time-frequency resources in the micro network time-frequency resource pool is greater than a first preset quantity; or a quantity of non-idle time-frequency resources in the micro network time-frequency resource pool is less than a preset quantity; or a percentage of idle time-frequency resources in the micro network time-frequency resource pool is greater than a first percentage; or a percentage of non-idle time-frequency resources in the micro network time-frequency resource pool is less than a second percentage.

According to the serving node establishment method provided in this embodiment, a network device sends information about a micro network time-frequency resource pool to a terminal and sends measurement configuration information to the terminal. The information about the micro network time-frequency resource pool includes information about a time-frequency resource used to transmit exclusive information of a serving node. The measurement configuration information includes a preset condition of at least one measurement event for triggering serving node establishment. The measurement configuration information is used to instruct the terminal to serve, when the terminal determines that the terminal meets a preset condition of a first measurement event, as a first serving node to send exclusive information of the first serving node on a first time-frequency resource in the micro network time-frequency resource pool according to the information about the micro network time-frequency resource pool. Therefore, the terminal can serve as the first serving node and can schedule a transmission time-frequency resource of another terminal connected to the terminal, so that a collision between transmission time-frequency resources of terminals can be avoided, and a success rate of communication between the terminals can be increased.

Figure 7:
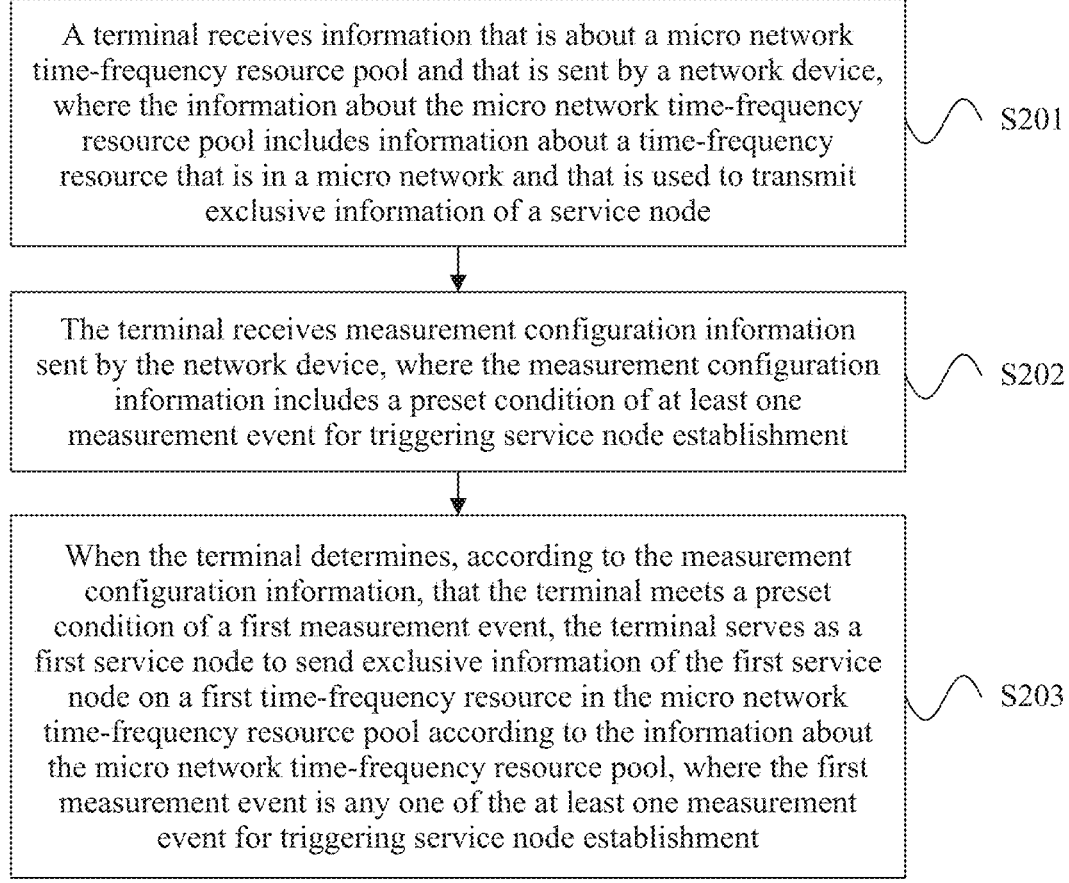
FIG. 7 is a flowchart of Embodiment 2 of a serving node establishment method according to the present invention.

FIG. 7 is a flowchart of Embodiment 2 of a serving node establishment method according to the present invention. As shown in FIG. 7, the method in this embodiment may include the following steps.

S201. A terminal receives information that is about a micro network time-frequency resource pool and that is sent by a network device, where the information about the micro network time-frequency resource pool includes information about a time-frequency resource that is in a micro network and that is used to transmit exclusive information of a serving node.

S202. The terminal receives measurement configuration information sent by the network device, where the measurement configuration information includes a preset condition of at least one measurement event for triggering serving node establishment.

In this embodiment, a terminal may receive information that is about a micro network time-frequency resource pool and that is sent by a network device. The micro network time-frequency resource pool includes a time-frequency resource used to transmit exclusive information of a serving node. The information about the micro network time-frequency resource pool includes information about the time-frequency resource used to transmit exclusive information of a serving node. The exclusive information of the serving node may include identifier information of the serving node and information about a contention time-frequency resource pool available to the serving node. The contention time-frequency resource pool available to the serving node indicates a contention time-frequency resource pool that is available after the terminal is connected to the serving node. The terminal may further receive measurement configuration information sent by the network device. The measurement configuration information includes a preset condition of at least one measurement event for triggering serving node establishment.

It should be noted that there is no execution sequence between S201 and S202. Alternatively, the terminal may receive, by using a same message or different messages, the information about the micro network time-frequency resource pool and the measurement configuration information that are sent by the network device.

S203. When the terminal determines, according to the measurement configuration information, that the terminal meets a preset condition of a first measurement event, the terminal serves as a first serving node to send exclusive information of the first serving node on a first time-frequency resource in the micro network time-frequency resource pool according to the information about the micro network time-frequency resource pool, where the first measurement event is any one of the at least one measurement event for triggering serving node establishment.

In this embodiment, after the terminal receives the measurement configuration information, the terminal may determine, according to a preset condition of each measurement event, that the terminal meets a preset condition of which measurement event, for example, the terminal meets the preset condition of the first measurement event. Then, the terminal serves as the first serving node to send (for example, broadcast) the exclusive information of the first serving node on the first time-frequency resource in the micro network time-frequency resource pool according to the information about the micro network time-frequency resource pool. Another terminal that receives the exclusive information of the first serving node may connect to the first serving node, so as to transmit data under scheduling of the first serving node. Optionally, the exclusive information of the first serving node includes an identifier of the first serving node and information about a contention time-frequency resource pool of the first serving node, so that another terminal can determine, according to the exclusive information of the first serving node, a serving node for access, and after connecting to the first serving node, can transmit data according to the information about the contention time-frequency resource pool or by means of free contention.

According to the serving node establishment method provided in this embodiment, a terminal receives information that is about a micro network time-frequency resource pool and that is sent by a network device, and receives measurement configuration information sent by the network device. The information about the micro network time-frequency resource pool includes information about a time-frequency resource used to transmit exclusive information of a serving node. The measurement configuration information includes a preset condition of at least one measurement event for triggering serving node establishment. When the terminal determines, according to the measurement configuration information, that the terminal meets a preset condition of a first measurement event, the terminal serves as a first serving node to send exclusive information of the first serving node on a first time-frequency resource in the micro network time-frequency resource pool according to the information about the micro network time-frequency resource pool. Therefore, the terminal can serve as the first serving node and can schedule a transmission time-frequency resource of another terminal connected to the terminal, so that a collision between transmission time-frequency resources of terminals can be avoided, and a success rate of communication between the terminals can be increased.

Optionally, the preset condition of the first measurement event includes: an idle time-frequency resource exists in the micro network time-frequency resource pool.

Optionally, that an idle time-frequency resource exists in the micro network time-frequency resource pool includes: a quantity of idle time-frequency resources in the micro network time-frequency resource pool is greater than a first preset quantity; or a quantity of non-idle time-frequency resources in the micro network time-frequency resource pool is less than a preset quantity; or a percentage of idle time-frequency resources in the micro network time-frequency resource pool is greater than a first percentage; or a percentage of non-idle time-frequency resources in the micro network time-frequency resource pool is less than a second percentage.

Figure 8:
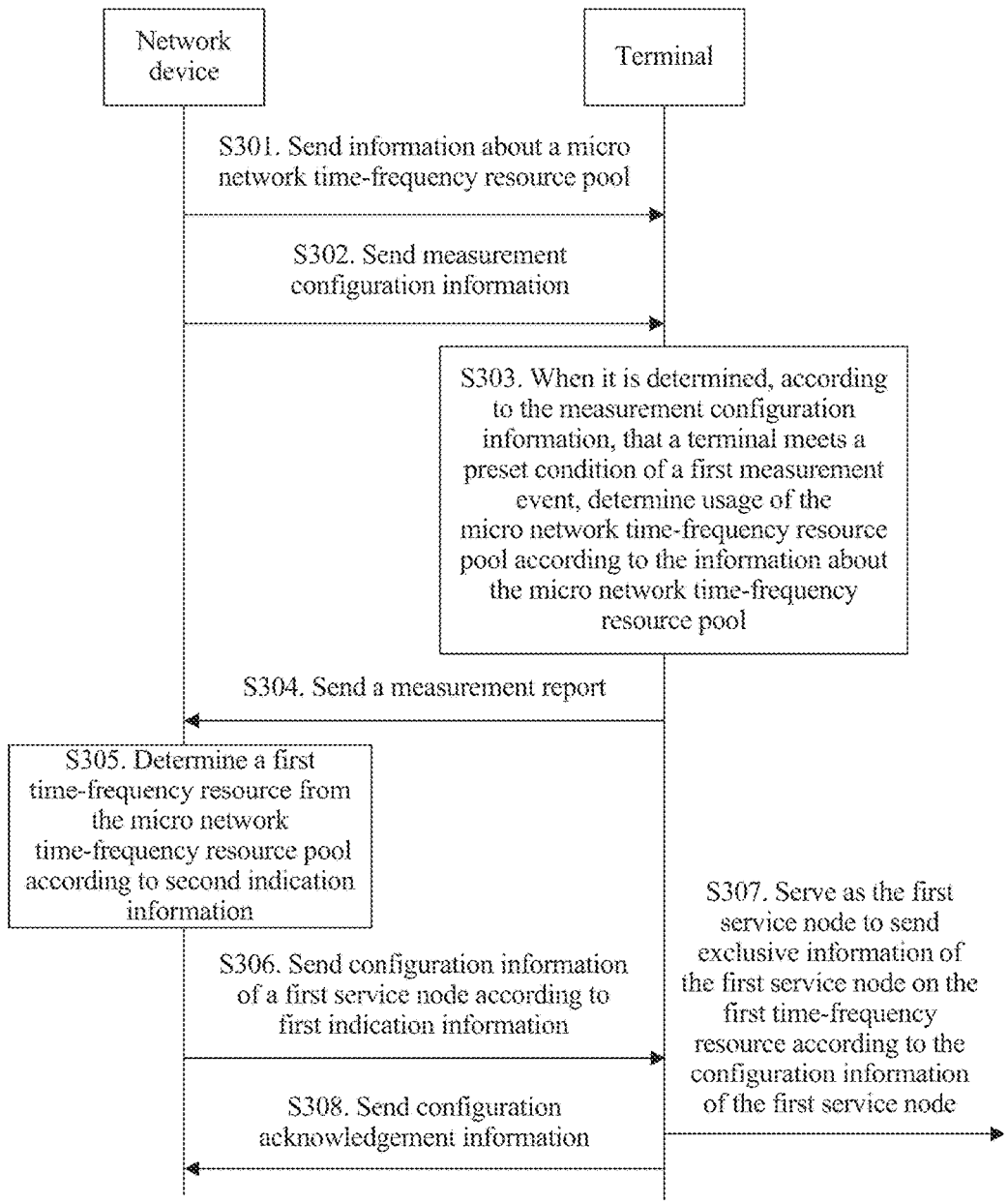
FIG. 8 is a flowchart of Embodiment 3 of a serving node establishment method according to the present invention.

FIG. 8 is a flowchart of Embodiment 3 of a serving node establishment method according to the present invention. As shown in FIG. 8, the method in this embodiment may include the following steps.

S301. A network device sends information about a micro network time-frequency resource pool to a terminal.

S302. The network device sends measurement configuration information to the terminal.

In this embodiment, for specific implementation processes of S301 and S302, refer to related records in Embodiment 1 or 2 of a method in the present invention. Details are not described herein again.

S303. When the terminal determines, according to the measurement configuration information, that the terminal meets a preset condition of a first measurement event, the terminal determines usage of the micro network time-frequency resource pool according to the information about the micro network time-frequency resource pool.

S304. The terminal sends a measurement report to the network device.

In this embodiment, when the terminal determines, according to a preset condition of at least one measurement event for triggering serving node establishment, that the terminal meets a preset condition of any one of the at least one measurement event for triggering serving node establishment, the any one measurement event is a first measurement event, and the terminal may serve as a first serving node. Then, the terminal determines usage of the micro network time-frequency resource pool, that is, determines an idle time-frequency resource and a non-idle time-frequency resource in the micro network time-frequency resource pool according to information about the micro network time-frequency resource pool, and further sends a measurement report to the network device. The measurement report includes first indication information and second indication information. The first indication information is used to indicate that the terminal meets the preset condition of the first measurement event, and the second indication information is used to indicate the usage of the micro network time-frequency resource pool.

Optionally, the measurement configuration information further includes an identifier of each of the at least one measurement event for triggering serving node establishment, and the first indication information may include an identifier of the first measurement event. Optionally, the second indication information may indicate an idle time-frequency resource in the micro network time-frequency resource pool and/or a non-idle time-frequency resource in the micro network time-frequency resource pool.

Optionally, before the terminal sends the measurement report to the network device, the terminal may further determine that when the terminal falls within signal coverage of the network device, that is, when the terminal is located in a macro cell controlled by the network device, the terminal sends the measurement report to the network device.

Optionally, in a first optional implementation, the preset condition of the first measurement event further includes: signal quality of a serving macro cell of the terminal is greater than first preset quality.

In a second optional implementation, the preset condition of the first measurement event further includes signal quality of a serving macro cell of the terminal is greater than first preset quality and the terminal is located in a preset area. The terminal may determine, by using a positioning technology, whether the terminal is located in the preset area.

In a third optional implementation, the preset condition of the first measurement event further includes: signal quality of a serving macro cell of the terminal is less than first preset quality and greater than second preset quality, and signal quality of a neighboring macro cell of the terminal is less than third preset quality.

In a fourth optional implementation, the preset condition of the first measurement event further includes: a quantity of idle time-frequency resources in a contention resource pool available to the terminal is less than a second preset quantity, and signal quality of a serving macro cell of the terminal is greater than fourth preset quality.

In a fifth optional implementation, the preset condition of the first measurement event further includes: a data sending failure count of the terminal is greater than a first preset count. The data sending failure count of the terminal may be a transmission time-frequency resource collision count of the terminal.

In a sixth optional implementation, the preset condition of the first measurement event further includes: a buffer data volume of to-be-sent data of the terminal is greater than a preset data volume.

S305. The network device determines a first time-frequency resource from the micro network time-frequency resource pool according to the second indication information.

In this embodiment, after receiving the measurement report, the network device determines the idle time-frequency resource in the micro network time-frequency resource pool according to the second indication information, and then determines the first time-frequency resource from the idle time-frequency resource. The first time-frequency resource is a time-frequency resource used to transmit exclusive information of the terminal serving as the first serving node.

S306. The network device sends configuration information of the first serving node to the terminal according to the first indication information.

In this embodiment, the network device determines, according to the first indication information, that the terminal meets the preset condition of the first measurement event, so that the terminal can serve as the first serving node. The network device may send, to the terminal, the configuration information of the terminal serving as the first serving node. The configuration information of the first serving node includes information about the first time-frequency resource, and information about a contention time-frequency resource pool available to the first serving node and/or information about a scheduling time-frequency resource pool available to the first serving node. The contention time-frequency resource pool includes a time-frequency resource used for transmitting data by means of free contention by a terminal connected to the first serving node. The scheduling time-frequency resource includes a time-frequency resource that is scheduled by the first serving node and that is used for transmitting data by the terminal connected to the first serving node.

S307. The terminal serves as the first serving node to send exclusive information of the first serving node on the first time-frequency resource according to the configuration information of the first serving node.

In this embodiment, after receiving the configuration information of the first serving node that is sent by the network device, the terminal may determine that the network device allows the terminal to configure the terminal as the first serving node. Then, the terminal may serve as the first serving node to send the exclusive information of the first serving node on the first time-frequency resource according to the configuration information of the first serving node, so that another terminal that receives the exclusive information of the first serving node connects to the first serving node, and the first serving node can schedule a time-frequency resource used for transmitting data by the another terminal connected to the first serving node.

Optionally, the method in this embodiment may further include the following step.

S308. The terminal sends configuration acknowledgement information to the network device.

In this embodiment, the terminal may further send the configuration acknowledgement information to the network device. The configuration acknowledgement information is used to indicate that the terminal has been configured as the first serving node.

According to the serving node establishment method provided in this embodiment, a network device sends information about a micro network time-frequency resource pool to a terminal and sends measurement configuration information to the terminal. The micro network time-frequency resource pool includes a time-frequency resource used to transmit exclusive information of a serving node. The measurement configuration information includes a preset condition of at least one measurement event for triggering serving node establishment. When determining that the terminal meets a preset condition of a first measurement event, the terminal determines usage of the micro network time-frequency resource pool according to the information about the micro network time-frequency resource pool, and sends a measurement report to the network device. The network device determines a first time-frequency resource from the micro network time-frequency resource pool according to the measurement report and sends configuration information of a first serving node to the terminal. The terminal serves as the first serving node to send exclusive information of the first serving node on the first time-frequency resource according to the configuration information of the first serving node. Therefore, the terminal can serve as the first serving node and can schedule a transmission time-frequency resource of another terminal connected to the terminal, so that a collision between transmission time-frequency resources of terminals can be avoided, and a success rate of communication between the terminals can be increased.

Figure 9:
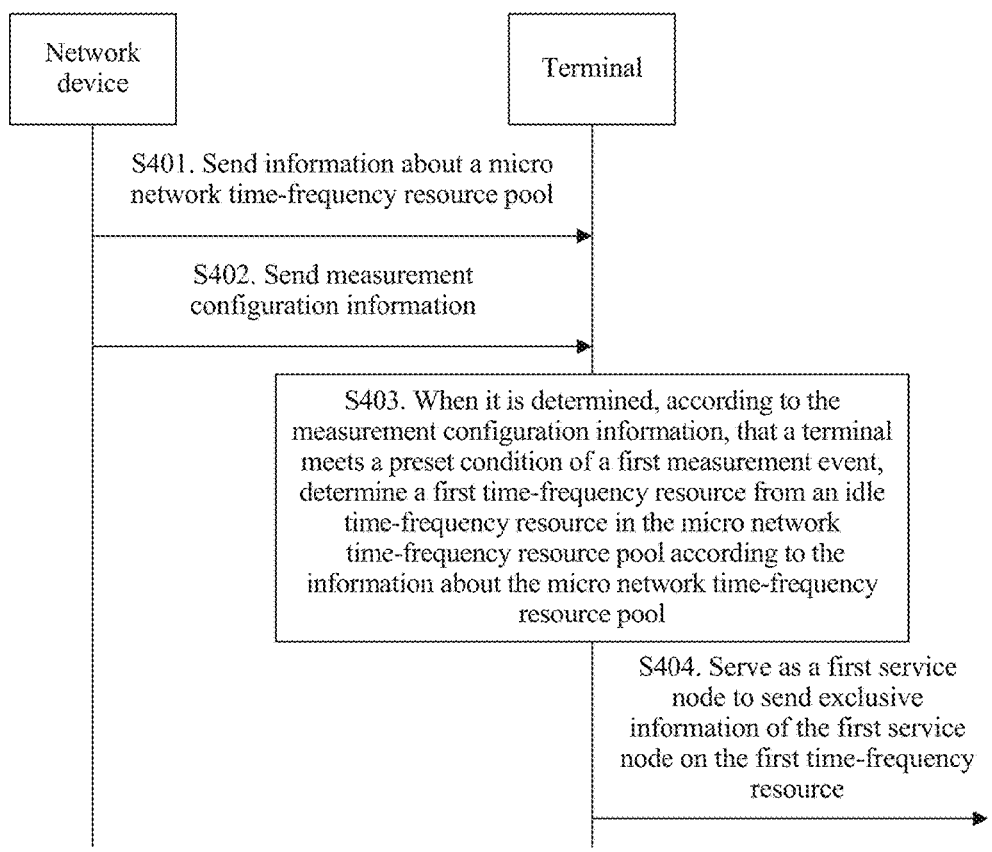
FIG. 9 is a flowchart of Embodiment 4 of a serving node establishment method according to the present invention.

FIG. 9 is a flowchart of Embodiment 4 of a serving node establishment method according to the present invention. As shown in FIG. 9, the method in this embodiment may include the following steps.

S401. A network device sends information about a micro network time-frequency resource pool to a terminal.

S402. The network device sends measurement configuration information to the terminal.

In this embodiment, for specific implementation processes of S401 and S402, refer to related records in Embodiment 1 or 2 of a method in the present invention. Details are not described herein again.

S403. When the terminal determines, according to the measurement configuration information, that the terminal meets a preset condition of a first measurement event, the terminal determines a first time-frequency resource from an idle time-frequency resource in the micro network time-frequency resource pool according to the information about the micro network time-frequency resource pool.

In this embodiment, when the terminal determines, according to a preset condition of at least one measurement event for triggering serving node establishment, that the terminal meets a preset condition of a first measurement event, the terminal determines a micro network time-frequency resource pool according to information about the micro network time-frequency resource pool, and determines a first time-frequency resource from an idle time-frequency resource in the micro network time-frequency resource pool. The first time-frequency resource is a time-frequency resource used to transmit exclusive information of the terminal serving as a first serving node.

S404. The terminal serves as the first serving node to send exclusive information of the first serving node on the first time-frequency resource.

In this embodiment, the terminal serves as the first serving node to send the exclusive information of the first serving node on the determined first time-frequency resource, so that another terminal that receives the exclusive information of the first serving node connects to the first serving node, and the first serving node can schedule a time-frequency resource used for transmitting data by the another terminal connected to the first serving node.

Optionally, in a first optional implementation, the preset condition of the first measurement event further includes: signal quality of a serving macro cell of the terminal is less than fifth preset quality, and signal quality of a neighboring macro cell of the terminal is less than sixth preset quality.

In a second optional implementation, the preset condition of the first measurement event further includes: a quantity of idle time-frequency resources in a contention resource pool available to the terminal is less than a third preset quantity.

In a third optional implementation, the preset condition of the first measurement event further includes: a data sending failure count of the terminal is greater than a second preset count.

Optionally, before the terminal determines the first time-frequency resource from the idle time-frequency resource in the micro network time-frequency resource pool according to the information about the micro network time-frequency resource pool, the terminal may further determine that when the terminal falls beyond signal coverage of the network device, that is, when the terminal is not located in a macro cell controlled by the network device, the terminal may serve as the first serving node without instruction from the network device and then determine the first time-frequency resource from the idle time-frequency resource in the micro network time-frequency resource pool.

According to the serving node establishment method provided in this embodiment, a network device sends information about a micro network time-frequency resource pool to a terminal and sends measurement configuration information to the terminal. The information about the micro network time-frequency resource pool includes information about a time-frequency resource used to transmit exclusive information of a serving node. The measurement configuration information includes at least one preset condition for triggering serving node establishment. When the terminal determines, according to the measurement configuration information, that the terminal meets a first measurement event, the terminal determines a first time-frequency resource from an idle time-frequency resource in the micro network time-frequency resource pool according to the information about the micro network time-frequency resource pool, and then serves as a first serving node to send exclusive information of the first serving node on the first time-frequency resource. Therefore, the terminal can serve as the first serving node and can schedule a transmission time-frequency resource of another terminal connected to the terminal, so that a collision between transmission time-frequency resources of terminals can be avoided, and a success rate of communication between the terminals can be increased.

Optionally, the micro network is a network that supports D2D communication. For example, devices in the micro network communicate with each other in a direct communication manner.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A network device, comprising:
    a transmitter, configured to send information about a micro network time-frequency resource pool to a terminal, wherein the information about the micro network time-frequency resource pool comprises information about a time-frequency resource that is in a micro network and that is used to transmit exclusive information of a serving node;
    wherein the transmitter is further configured to send measurement configuration information to the terminal, wherein the measurement configuration information comprises a preset condition of at least one measurement event for triggering serving node establishment, wherein the measurement configuration information instructs the terminal to serve, when the terminal determines that the terminal meets a preset condition of a first measurement event, as a first serving node to send exclusive information of the first serving node on a first time-frequency resource in the micro network time-frequency resource pool according to the information about the micro network time-frequency resource pool, and wherein the first measurement event is any one of the at least one measurement event for triggering serving node establishment.

2. The network device according to claim 1, wherein the exclusive information of the first serving node comprises an identifier of the first serving node and information about a contention time-frequency resource pool of the first serving node.

3. The network device according to claim 1, wherein the preset condition of the first measurement event comprises that an idle time-frequency resource exists in the micro network time-frequency resource pool.

4. The network device according to claim 3, wherein the preset condition of the first measurement event further comprises one of:
    signal quality of a serving macro cell of the terminal being greater than first preset quality; or
    signal quality of a serving macro cell of the terminal being greater than first preset quality and the terminal is located in a preset area; or
    signal quality of a serving macro cell of the terminal being less than first preset quality and greater than second preset quality, and signal quality of a neighboring macro cell of the terminal being less than third preset quality; or
    a quantity of idle time-frequency resources in a contention resource pool available to the terminal being less than a second preset quantity, and signal quality of a serving macro cell of the terminal being greater than fourth preset quality; or
    a data sending failure count of the terminal being greater than a first preset count; or
    a buffer data volume of to-be-sent data of the terminal being greater than a preset data volume.

5. A terminal, comprising:
    a receiver, configured to receive information that is about a micro network time-frequency resource pool and that is sent by a network device, wherein the information about the micro network time-frequency resource pool comprises information about a time-frequency resource that is in a micro network and that is used to transmit exclusive information of a serving node, wherein the receiver is further configured to receive measurement configuration information sent by the network device, wherein the measurement configuration information comprises a preset condition of at least one measurement event for triggering serving node establishment;
    a processor;
    a non-transitory computer-readable storage medium storing a program to be executed by the processor, the program including instructions to:
        determine, according to the measurement configuration information, whether a preset condition of a first measurement event is met; and
    a transmitter, configured to use the terminal, in response to determining, according to the measurement configuration information, that the terminal meets the preset condition of the first measurement event, as a first serving node to send exclusive information of the first serving node on a first time-frequency resource in the micro network time-frequency resource pool according to the information about the micro network time-frequency resource pool, wherein the first measurement event is any one of the at least one measurement event for triggering serving node establishment.

6. The terminal according to claim 5, wherein the exclusive information of the first serving node comprises an identifier of the first serving node and information about a contention time-frequency resource pool of the first serving node.

7. The terminal according to claim 5, wherein the preset condition of the first measurement event comprises that an idle time-frequency resource exists in the micro network time-frequency resource pool.

8. The terminal according to claim 7, wherein the preset condition of the first measurement event further comprises one of:

signal quality of a serving macro cell of the terminal being greater than first preset quality; or signal quality of a serving macro cell of the terminal being greater than first preset quality and the terminal is located in a preset area; or signal quality of a serving macro cell of the terminal being less than first preset quality and greater than second preset quality, and signal quality of a neighboring macro cell of the terminal being less than third preset quality; or a quantity of idle time-frequency resources in a contention resource pool available to the terminal being less than a second preset quantity, and signal quality of a serving macro cell of the terminal being greater than fourth preset quality; or a data sending failure count of the terminal being greater than a first preset count; or a buffer data volume of to-be-sent data of the terminal being greater than a preset data volume.

9. The terminal according to claim 8, wherein the transmitter is further configured to determine usage of the micro network time-frequency resource pool according to the information about the micro network time-frequency resource pool;

wherein the transmitter is further configured to send a measurement report to the network device, wherein the measurement report comprises first indication information used to indicate that the terminal meets the preset condition of the first measurement event, and second indication information used to indicate the usage of the micro network time-frequency resource pool;

wherein the transmitter is further configured to receive configuration information of the first serving node that is sent by the network device, wherein the configuration information of the first serving node comprises information about the first time-frequency resource, and information about a contention time-frequency resource pool available to the first serving node and/or information about a scheduling time-frequency resource pool available to the first serving node; and wherein the transmitter is further configured to use the terminal as the first serving node to send the exclusive information of the first serving node on the first time-frequency resource according to the configuration information of the first serving node.

10. The terminal according to claim 9, wherein the transmitter is further configured to send configuration acknowledgement information to the network device after using the terminal as the first serving node to send the configuration information of the first serving node on the first time-frequency resource according to the configuration information of the first serving node, wherein the configuration acknowledgement information indicates that the terminal has been configured as the first serving node.

11. A serving node establishment method, comprising:
sending, by a network device, information about a micro network time-frequency resource pool to a terminal, wherein the information about the micro network time-frequency resource pool comprises information about a time-frequency resource that is in a micro network and that is used to transmit exclusive information of a serving node; and sending, by the network device, measurement configuration information to the terminal, wherein the measurement configuration information comprises a preset condition of at least one measurement event for triggering serving node establishment, wherein the measurement configuration information instructs the terminal to serve, when the terminal determines that the terminal meets a preset condition of a first measurement event, as a first serving node to send exclusive information of the first serving node on a first time-frequency resource in the micro network time-frequency resource pool according to the information about the micro network time-frequency resource pool, and the first measurement event is any one of the at least one measurement event for triggering serving node establishment.

12. The method according to claim 11, wherein the exclusive information of the first serving node comprises an identifier of the first serving node and information about a contention time-frequency resource pool of the first serving node.

13. The method according to claim 11, wherein the preset condition of the first measurement event comprises that an idle time-frequency resource exists in the micro network time-frequency resource pool.

14. The method according to claim 13, wherein the preset condition of the first measurement event further comprises:
signal quality of a serving macro cell of the terminal is greater than first preset quality; or signal quality of a serving macro cell of the terminal is greater than first preset quality and the terminal is located in a preset area; or signal quality of a serving macro cell of the terminal is less than first preset quality and greater than second preset quality, and signal quality of a neighboring macro cell of the terminal is less than third preset quality; or a quantity of idle time-frequency resources in a contention resource pool available to the terminal is less than a second preset quantity, and signal quality of a serving macro cell of the terminal is greater than fourth preset quality; or a data sending failure count of the terminal is greater than a first preset count; or a buffer data volume of to-be-sent data of the terminal is greater than a preset data volume.

15. A serving node establishment method, comprising:
receiving, by a terminal, information that is about a micro network time-frequency resource pool and that is sent by a network device, wherein the information about the micro network time-frequency resource pool comprises information about a time-frequency resource that is in a micro network and that is used to transmit exclusive information of a serving node;

receiving, by the terminal, measurement configuration information sent by the network device, wherein the measurement configuration information comprises a preset condition of at least one measurement event for triggering serving node establishment; and when the terminal determines, according to the measurement configuration information, that the terminal meets a preset condition of a first measurement event, serving, by the terminal, as a first serving node to send exclusive information of the first serving node on a first time-frequency resource in the micro network time-frequency resource pool according to the information about the micro network time-frequency resource pool, wherein the first measurement event is any one of the at least one measurement event for triggering serving node establishment.

16. The method according to claim 15, wherein the exclusive information of the first serving node comprises an identifier of the first serving node and information about a contention time-frequency resource pool of the first serving node.

17. The method according to claim 15, wherein the preset condition of the first measurement event comprises that an idle time-frequency resource exists in the micro network time-frequency resource pool.

18. The method according to claim 17, wherein the preset condition of the first measurement event further comprises one of:
    signal quality of a serving macro cell of the terminal is greater than first preset quality; or
    signal quality of a serving macro cell of the terminal is greater than first preset quality and the terminal is located in a preset area; or
    signal quality of a serving macro cell of the terminal is less than first preset quality and greater than second preset quality, and signal quality of a neighboring macro cell of the terminal is less than third preset quality; or
    a quantity of idle time-frequency resources in a contention resource pool available to the terminal is less than a second preset quantity, and signal quality of a serving macro cell of the terminal is greater than fourth preset quality; or
    a data sending failure count of the terminal is greater than a first preset count; or
    a buffer data volume of to-be-sent data of the terminal is greater than a preset data volume.

19. The method according to claim 18, wherein the serving, by the terminal, as a first serving node to send exclusive information of the first serving node on a first time-frequency resource in the micro network time-frequency resource pool according to the information about the micro network time-frequency resource pool comprises:

determining, by the terminal, usage of the micro network time-frequency resource pool according to the information about the micro network time-frequency resource pool;
   sending, by the terminal, a measurement report to the network device, wherein the measurement report comprises first indication information used to indicate that the terminal meets the preset condition of the first measurement event, and second indication information indicates the usage of the micro network time-frequency resource pool;
   receiving, by the terminal, configuration information of the first serving node that is sent by the network device, wherein the configuration information of the first serving node comprises information about the first time-frequency resource, and information about a contention time-frequency resource pool available to the first serving node and/or information about a scheduling time-frequency resource pool available to the first serving node; and
   serving, by the terminal, as the first serving node to send the exclusive information of the first serving node on the first time-frequency resource according to the configuration information of the first serving node.

20. The method according to claim 19, after the serving, by the terminal, as the first serving node to send the control information of the first serving node on the first time-frequency resource according to configuration information of the first serving node, further comprising:
   sending, by the terminal, configuration acknowledgement information to the network device, wherein the configuration acknowledgement information indicates that the terminal has been configured as the first serving node.

* * * * *